(12) United States Patent
Kurosaki

(10) Patent No.: US 12,421,066 B2
(45) Date of Patent: Sep. 23, 2025

(54) TOILET PAPER ROLL MANUFACTURING METHOD

(71) Applicant: CORELEX SHIN-EI CO., LTD., Fuji (JP)

(72) Inventor: Satoshi Kurosaki, Shizuoka (JP)

(73) Assignee: CORELEX SHIN-EI CO., LTD., Fuji (JP)

( * ) Notice: Subject to any disclaimer, the term of this patent is extended or adjusted under 35 U.S.C. 154(b) by 0 days.

(21) Appl. No.: 18/288,517

(22) PCT Filed: Dec. 19, 2022

(86) PCT No.: PCT/JP2022/046613
§ 371 (c)(1),
(2) Date: Oct. 26, 2023

(87) PCT Pub. No.: WO2023/210057
PCT Pub. Date: Nov. 2, 2023

(65) Prior Publication Data
US 2025/0083917 A1    Mar. 13, 2025

(30) Foreign Application Priority Data

Apr. 28, 2022   (JP) ................... 2022-074150

(51) Int. Cl.
*B65H 18/08*   (2006.01)
(52) U.S. Cl.
CPC ....... *B65H 18/08* (2013.01); *B65H 2301/517* (2013.01)
(58) Field of Classification Search
CPC .......................... B65H 18/08; B65H 2301/517
See application file for complete search history.

(56) References Cited

U.S. PATENT DOCUMENTS

2022/0354315 A1* 11/2022 Tanikawa ............. D21H 27/002

FOREIGN PATENT DOCUMENTS

| EP | 1841470 B1 | 2/2010 |
|---|---|---|
| JP | 2007-260161 A | 10/2007 |
| JP | 2012-000476 A | 1/2012 |
| JP | 2018-023561 A | 2/2018 |
| JP | 2018023561 * | 9/2020 |
| JP | 2022-031007 A | 2/2022 |
| KR | 10-2018-0041290 A | 4/2018 |
| WO | 02/14061 A1 | 2/2002 |
| WO | 2006/099881 A1 | 9/2006 |

OTHER PUBLICATIONS

Communication dated Jul. 3, 2024 issued by the European Patent Office in application No. 22937660.3.
International Search Report for PCT/JP2022/046613 dated Feb. 21, 2023.

* cited by examiner

*Primary Examiner* — Nathan T Leong
(74) *Attorney, Agent, or Firm* — Sughrue Mion, PLLC

(57) ABSTRACT

A toilet paper roll manufacturing method is provided with which, when 4-ply toilet paper is torn off, individual layered sheets of the paper are prevented from peeling off each other and a good appearance is ensured. A sprayer 22a sprays a bonding liquid between two 1-ply paper sheets 110 and 111, a sprayer 22b sprays the bonding liquid between two 1-ply paper sheets 111 and 100, a sprayer 22c sprays the bonding liquid between two 1-ply paper sheets 100 and 101, and pressure rollers 23 stack the 1-ply paper sheets 110, 111, 100, and 101 and apply pressure to those sheets.

12 Claims, 2 Drawing Sheets

TOILET PAPER ROLL MANUFACTURING METHOD

CROSS REFERENCE TO RELATED APPLICATIONS

This application is a National Stage of International Application No. PCT/JP2022/046613 filed Dec. 19, 2022, claiming priority based on Japanese Patent Application No. 2022-074150 filed Apr. 28, 2022.

TECHNICAL FIELD

The present disclosure relates to a method of manufacturing a 4-ply toilet paper roll that is formed by laminating and rolling up four sheets of paper into a roll.

BACKGROUND ART

Until now, a (1-ply) toilet paper roll formed by rolling up one sheet of paper into a roll or a 2-ply toilet paper roll formed by laminating and rolling up two sheets of base paper into a roll has been manufactured and sold generally.

Furthermore, a toilet paper roll formed by laminating and rolling up three or more sheets of paper into a roll has also been manufactured and sold with intent to increase absorbency.

When the three or more sheets of paper are laminated as described above, the laminated paper is so thick that it is difficult to tear off a pulled-out portion of the laminated paper from a paper roll.

In some of the paper rolls formed by laminating the three or more sheets of paper, perforations are formed in the laminated paper at constant intervals to make the pulled-out portion of the laminated paper easily torn off from the paper roll.

In regard to the manufacturing of the 3-ply toilet paper roll, for example, there is known a method of gluing one ply on a front side to at least one ply in an intermediate layer, forming a micro-embossed pattern in two plies on a rear side, and laminating those three plies in order that the individual plies may become hard to peel off. In regard to the manufacturing of the 4-ply toilet paper roll, there is known a method of forming a decoration embossed pattern in two plies on a front side and forming a micro-embossed pattern in two plies on a rear side. The latter method further includes a step of gluing at least one rear-side ply of the two plies on the front side to at least one front-side ply of the two plies on the rear side (Patent Literature (PTL) 1).

In a variation of the above-mentioned 4-ply toilet paper roll, two layers forming intermediate layers of four plies are glued together. Furthermore, a decoration embossed pattern of relatively large size is formed in two outer-side layers of the four plies, and a micro-embossed pattern formed in the two layers (intermediate layers) glued together are brought into strong contact with the decoration embossed pattern to be laminated in order that those layers may become hard to peel off.

In another example of the above-mentioned 4-ply toilet paper roll, the decoration embossed pattern is formed in one ply on the front side, the micro-embossed pattern is formed in three plies on the rear side, and the one ply on the front side is glued to the second ply from the front side.

CITATION LIST

Patent Literature

PTL 1: Japanese Unexamined Patent Application Publication No. 2018-23561

SUMMARY OF INVENTION

Technical Problem

The 4-ply toilet paper roll manufactured by laminating multiple sheets of paper as described above includes a portion in which those sheets are laminated, for example, while embossed patterns of different sizes are brought into strong contact with each other without using any bonding liquid such as water or glue. Accordingly, there is a possibility that, when a desired length of the toilet paper is torn off in a state in which the toilet paper roll is attached to a toilet paper holder, the individual laminated paper sheets may peel off each other from a torn-off end. If the laminated paper sheets stick out of the toilet paper holder in the loosely peeled-off state, an appearance of the toilet paper deteriorates.

The present disclosure has been made in consideration of the above-described problem and provides a toilet paper roll manufacturing method with which, when paper pulled out of a 4-ply toilet paper roll is torn off, individual layered sheets of the paper are prevented from peeling off each other, and a good appearance is ensured.

Solution to Problem

A toilet paper roll manufacturing method according to the present disclosure includes a first step of pulling out base paper from each of multiple base paper rolls; a second step of introducing multiple sheets of the base paper to a lamination unit, laminating the multiple sheets of the base paper, and forming 4-ply toilet paper; a third step of drying the 4-ply toilet paper; and a fourth step of rolling up the 4-ply toilet paper and manufacturing a 4-ply toilet paper roll, wherein the second step includes a fifth step of separating the multiple sheets of the base paper introduced to the lamination unit into a first 1-ply paper sheet, a second 1-ply paper sheet, a third 1-ply paper sheet, and a fourth 1-ply paper sheet, positioning a rear surface of the first 1-ply paper sheet and a front surface of the second 1-ply paper sheet to face each other, positioning a rear surface of the second 1-ply paper sheet and a front surface of the third 1-ply paper sheet to face each other, and positioning a rear surface of the third 1-ply paper sheet and a front surface of the fourth 1-ply paper sheet to face each other; a sixth step of operating a first sprayer to spray a bonding liquid toward the rear surface of the first 1-ply paper sheet and the front surface of the second 1-ply paper sheet; a seventh step of operating a second sprayer to spray the bonding liquid toward the rear surface of the second 1-ply paper sheet and the front surface of the third 1-ply paper sheet; an eighth step of operating a third sprayer to spray the bonding liquid toward the rear surface of the third 1-ply paper sheet and the front surface of the fourth 1-ply paper sheet; and a ninth step of operating a pressure roller to stack the first 1-ply paper sheet, the second 1-ply paper sheet, the third 1-ply paper sheet, and the fourth 1-ply paper sheet and to apply pressure to permeate the bonding liquid into the first to fourth 1-ply paper sheets.

In the second step, the sixth step, the seventh step, and the eighth step are performed simultaneously.

In the second step, the sixth step, the seventh step, and the eighth step are repeated intermittently such that spray of the bonding liquid by the first sprayer and the third sprayer and spray of the bonding liquid by the second sprayer are performed alternately.

In the second step, the sixth step, the seventh step, and the eighth step are repeated intermittently such that the first sprayer, the second sprayer, and the third sprayer intermittently spray the bonding liquid in different time lengths.

In the seventh step, an amount of the bonding liquid sprayed from the second sprayer is smaller than an amount of the bonding liquid sprayed from the first sprayer and an amount of the bonding liquid sprayed from the third sprayer.

In the seventh step, an amount of the bonding liquid sprayed from the second sprayer is larger than an amount of the bonding liquid sprayed from the first sprayer and an amount of the bonding liquid sprayed from the third sprayer.

Advantageous Effects of Invention

According to the present disclosure, when paper pulled out of the 4-ply toilet paper roll is torn off, individual layered sheets of the paper are prevented from peeling off each other, and a good appearance is ensured.

DESCRIPTION OF EMBODIMENTS

An embodiment of the present invention will be described below.

EMBODIMENT

Figure 1:
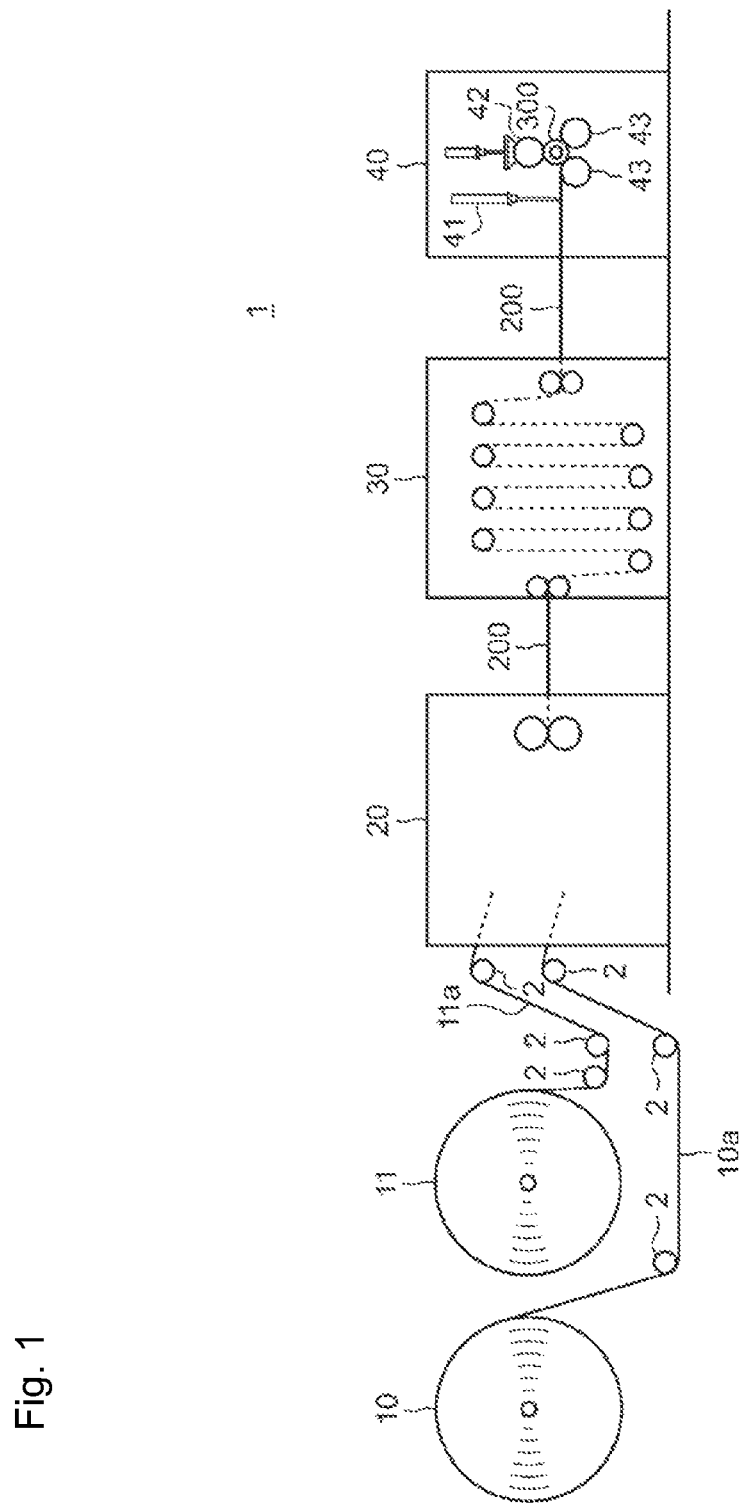
FIG. 1 is an explanatory view illustrating a schematic configuration of a toilet paper roll manufacturing apparatus using a toilet paper roll manufacturing method according to an embodiment of the present disclosure.

FIG. 1 is an explanatory view illustrating a schematic configuration of a toilet paper roll manufacturing apparatus 1 using a toilet paper roll manufacturing method according to the embodiment of the present disclosure.

The toilet paper roll manufacturing apparatus 1 is constituted to manufacture a 4-ply toilet paper roll 300 and includes, for example, guide rollers 2 for moving base paper 10a and base paper 11a pulled out of a base paper roll 10 and a base paper roll 11, respectively, to a lamination unit 20, and the lamination unit 20 for forming 4-ply toilet paper 200, as described later, out of the base paper 10a and the base paper 11a.

The toilet paper roll manufacturing apparatus 1 further includes a drying unit 30 for drying the 4-ply toilet paper 200, and a rolling-up unit 40 for rolling up the 4-ply toilet paper 200 after being dried and forming the 4-ply toilet paper roll 300.

The base paper 10a and the base paper 11a described here, by way of example, are each 2-ply base paper made up of two stacked paper sheets.

While the toilet paper roll manufacturing apparatus 1 illustrated in FIG. 1 is constituted to manufacture the 4-ply toilet paper roll 300 by introducing the 2-ply base paper 10a and the 2-ply base paper 11a to the lamination unit 20, the toilet paper roll manufacturing apparatus 1 according to the present invention may be constituted to supply four sheets of 1-ply base paper to the lamination unit 20 from four base paper rolls in one-to-one relation.

In the toilet paper roll manufacturing apparatus 1 of FIG. 1, for example, the multiple guide rollers 2 are installed in an arrangement causing the base paper 10a pulled out of the base paper roll 10 and the base paper 11a pulled out of the base paper roll 11 to be separately introduced to the lamination unit 20.

Figure 2:
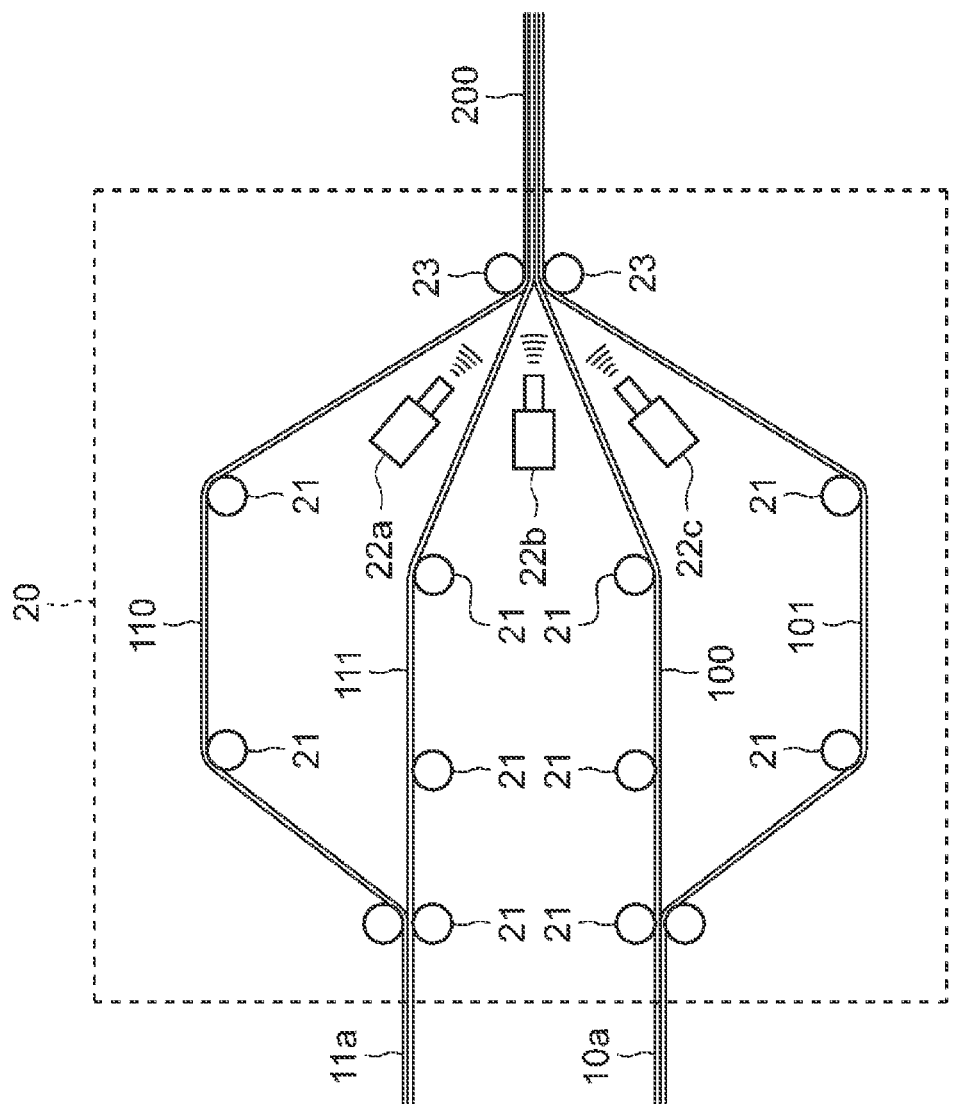
FIG. 2 is an explanatory view illustrating a schematic configuration of a lamination unit included in the toilet paper roll manufacturing apparatus of FIG. 1.

FIG. 2 is an explanatory view illustrating a schematic configuration of the lamination unit 20 included in the toilet paper roll manufacturing apparatus 1 of FIG. 1.

The lamination unit 20 includes, for example, multiple guide rollers 21 that are disposed to guide the 2-ply base paper 10a supplied from the base paper roll 10 to be separated into a 1-ply paper sheet 100 and a 1-ply paper sheet 101 and to separately transfer the 1-ply paper sheet 100 and the 1-ply paper sheet 101 to the vicinity of a sprayer 22c.

Furthermore, other multiple guide rollers 21 included in the lamination unit 20 are disposed to guide the 2-ply base paper 11a supplied from the base paper roll 11 to be separated into a 1-ply paper sheet 110 and a 1-ply paper sheet 111 and to separately transfer the 1-ply paper sheet 110 and the 1-ply paper sheet 111 to the vicinity of a sprayer 22a.

In addition, the guide rollers 21 are disposed to guide the transferred 1-ply paper sheet 100 to approach not only the sprayer 22c as described above, but also the sprayer 22b. Moreover, the guide rollers 21 are disposed to guide the transferred 1-ply paper sheet 111 to approach not only the sprayer 22a as described above, but also the sprayer 22b.

Stated another way, the lamination unit 20 includes the multiple guide rollers 21 for, when the 2-ply base paper 10a and the 2-ply base paper 11a are introduced to the lamination unit 20, separating the base paper 10a into the 1-ply paper sheet 100 and the 1-ply paper sheet 101 and separating the base paper 11a into the 1-ply paper sheet 110 and the 1-ply paper sheet 111. The lamination unit 20 further includes the multiple guide rollers 21 for guiding the 1-ply paper sheets 110, 111, 100, and 101, having been separated as described above, to be stacked and sandwiched between pressure rollers 23.

The pressure rollers 23 are constituted to form the 4-ply toilet paper 200 by stacking the 1-ply paper sheets 110, 111, 100, and 101 and applying appropriate pressure to those sheets.

The lamination unit 20 further includes the sprayer 22a for spraying a bonding liquid between the 1-ply paper sheet 110 and the 1-ply paper sheet 111, the sprayer 22b for spraying the bonding liquid between the 1-ply paper sheet 111 and the 1-ply paper sheet 100, and the sprayer 22c for spraying the bonding liquid between the 1-ply paper sheet 100 and the 1-ply paper sheet 101 before the 1-ply paper sheets 110, 111, 100, and 101 are sandwiched between the pressure rollers 23. An aqueous solution containing water, a perfume ingredient, and a deodorant ingredient can be used as the bonding liquid. In relation to the bonding liquid used in the sprayers 22a, 22b, and 22?, by spraying water from any one of the sprayers and spraying an aqueous solution containing the perfume ingredient, for example, from the other two, a concentration of the above-mentioned functional aqueous solution can be controlled.

An operation will be described below.

In the toilet paper roll manufacturing apparatus 1 of FIG. 1, for example, long sheets of the 2-ply base paper 10a and 11a are pulled out of the two base paper rolls 10 and 11, respectively, and are transferred to the lamination unit 20 by the multiple guide rollers 2.

In the lamination unit 20, the sheets of the base paper 10a and 11a introduced thereto by the guide rollers 2 are laminated after the bonding liquid has been applied to adhere to those sheets as described later, whereby the 4-ply toilet paper 200 of long size is formed.

The 4-ply toilet paper 200 formed in the lamination unit 20 is introduced to the drying unit 30 from the lamination unit 20.

The drying unit 30 includes, for example, multiple cylinders arranged in the inside and dries the 4-ply toilet paper 200 by letting the 4-ply toilet paper 200 having been introduced to the drying unit 30 to pass through the cylinders and by applying heat to the 4-ply toilet paper 200.

The 4-ply toilet paper 200 having been dried in the drying unit 30 is introduced to the rolling-up unit 40.

The rolling-up unit 40 rolls up the 4-ply toilet paper 200, introduced to the rolling-up unit 40, by a rolling-up pressure roller 42 and multiple rolling-up rollers 43. As a result, the 4-ply toilet paper roll 300 is manufactured.

Furthermore, the rolling-up unit 40 includes a cutter 41. After a predetermined length of the 4-ply toilet paper 200 has been rolled up by the rolling-up pressure roller 42 and the rolling-up rollers 43, the 4-ply toilet paper 200 introduced to the rolling-up unit 40 is cut by the cutter 41.

The rolling-up unit 40 repeats a step of successively rolling up the 4-ply toilet paper 200 supplied from the drying unit 30 and a step of cutting the 4-ply toilet paper 200 by the cutter 41 as described above, thus continuing to manufacture the 4-ply toilet paper roll 300.

In some cases, for example, the rolling-up unit 40 may include a cutter (not illustrated) for forming perforations in the 4-ply toilet paper 200 along a width direction, may form the perforations in the 4-ply toilet paper 200 at predetermined intervals, and may manufacture the 4-ply toilet paper roll 300 with the perforations.

An operation of laminating the 1-ply paper sheets 110, 111, 100, and 101 and forming the 4-ply toilet paper 200, performed by the lamination unit 20, will be described below.

When the base paper 10a and the base paper 11a are introduced, the lamination unit 20 lets the base paper 10a and the base paper 11a to pass through the guide rollers 21, thus separating the base paper 10a into the 1-ply paper sheet 100 and the 1-ply paper sheet 101. The lamination unit 20 further separates, like the base paper 10a, the base paper 11a into the 1-ply paper sheet 110 and the 1-ply paper sheet 111.

The 1-ply paper sheets 110, 111, 100, and 101 having passed through the guide rollers 21 are brought into, for example, a state in which a rear surface of the 1-ply paper sheet 110 and a front surface of the 1-ply paper sheet 111 face each other. Moreover, the above-mentioned 1-ply paper sheets are brought into a state in which a front surface of the 1-ply paper sheet 111 and a front surface of the 1-ply paper sheet 100 face each other, and a state in which a rear surface of the 1-ply paper sheet 100 and a front surface of the 1-ply paper sheet 101 face each other.

The 1-ply paper sheets 110, 111, 100, and 101 with their surfaces facing each other as described above are transferred by the guide rollers 21 toward the pressure rollers 23a while an appropriate gap is kept between each adjacent two of the 1-ply paper sheets.

The lamination unit 20 includes, as described above, the sprayers 22a, 22b, and 22c that spray the bonding liquid toward the surfaces of the 1-ply paper sheets 110, 111, 100, and 101 transferred by the guide rollers 21 (for adhering to those surfaces). The sprayers 22a, 22b, and 22c are installed between a position at which the base paper 10a and the base paper 11a are separated by the guide rollers 21 into the 1-ply paper sheets 110, 111, 100, and 101 and a position at which the pressure rollers 23 for stacking the 1-ply paper sheets 110, 111, 100, and 101 are installed.

The sprayers 22a, 22b, and 22c are each constituted to spray the bonding liquid toward a space at a predetermined position.

The sprayer 22a is installed to spray the bonding liquid to adhere to, for example, the rear surface of the 1-ply paper sheet 110 and the front surface of the 1-ply paper sheet 111.

The sprayer 22b is installed to spray the bonding liquid to adhere to, for example, the rear surface of the 1-ply paper sheet 111 and the front surface of the 1-ply paper sheet 100.

The sprayer 22c is installed to spray the bonding liquid to adhere to, for example, the rear surface of the 1-ply paper sheet 100 and the front surface of the 1-ply paper sheet 101.

When the 1-ply paper sheets 110, 111, 100, and 101 having passed through the guide rollers 21 are sandwiched between the pressure rollers 23, paper-to-paper gaps are narrowed.

In the toilet paper roll manufacturing apparatus 1 illustrated in FIG. 1, the sprayers 22a, 22b, and 22c are installed in the vicinity of the pressure rollers 23 where the paper-to-paper gaps are narrowed, for causing the bonding liquid to reliably adhere to the front surfaces or the rear surfaces of the 1-ply paper sheets.

In the configuration of the toilet paper roll manufacturing apparatus 1 implemented by the toilet paper roll manufacturing method according to the present invention, the positions of installation of the sprayers 22a, 22b, and 22c are not limited to those ones illustrated in FIG. 1.

In the lamination unit 20, for example, the sprayers 22a, 22b, and 22c spray the bonding liquid toward the front surfaces or the rear surfaces of the 1-ply paper sheets at the same time.

In another example, the sprayer 22b may be first operated to spray the bonding liquid to adhere to the rear surface of the 1-ply paper sheet 111 and the front surface of the 1-ply paper sheet 100. Then, the sprayers 22a and 22c may be operated to spray the bonding liquid to adhere to the rear surface of the 1-ply paper sheet 110 and the front surface of the 1-ply paper sheet 111 and to the rear surface of the 1-ply paper sheet 100 and the front surface of the 1-ply paper sheet 101, respectively.

Alternatively, the sprayers 22a and 22c may be first operated to spray the bonding liquid to adhere to the rear surface of the 1-ply paper sheet 110 and the front surface of the 1-ply paper sheet 111 and to the rear surface of the 1-ply paper sheet 100 and the front surface of the 1-ply paper sheet 101, respectively. Then, the sprayer 22b may be operated to spray the bonding liquid to adhere to the rear surface of the 1-ply paper sheet 111 and the front surface of the 1-ply paper sheet 100.

As described above, the bonding liquid is sprayed to only one surface of each of the 1-ply paper sheet 110 and the 1-ply paper sheet 101 while the bonding liquid is sprayed to both the surfaces of each of the 1-ply paper sheet 111 and the 1-ply paper sheet 100.

Therefore, the strength of the 1-ply paper sheets 111 and 100 is more apt to reduce due to the bonding liquid adhering thereto than that of the 1-ply paper sheets 110 and 101.

Damage of the 1-ply paper sheets 111 and 100 may be prevented by, as described above, setting the timing (operation) to spray the bonding liquid toward the 1-ply paper sheets 111 and 100 from the sprayer 22b to be different from the timing (operation) to spray the bonding liquid toward those 1-ply paper sheets from the sprayers 22a and 22c.

In a specific example, spray operations of the sprayers 22a, 22b, and 22c are intermittently repeated while, for example, the spray timing of the sprayers 22a and 22c and the spray timing of the sprayer 22b are shifted from each other. In other words, the spray from the sprayers 22a and 22c and the spray from the sprayer 22b are alternately performed.

When the sprays are intermittently performed as described above, the sprays from the sprayers 22a, 22b, and 22c may be performed in different time lengths.

For example, the spray time length of the sprayer 22b may be set to be shorter than that of the sprayers 22a and 22c. As an alternative, if the 1-ply paper sheets 111 and 100 have sufficient strength even after permeation of the bonding liquid, the spray time length of the sprayer 22b may be set to be longer than that of the sprayers 22a and 22c.

Furthermore, because the bonding liquid adheres to both the front and rear surfaces of each of the 1-ply paper sheets 111 and 100 as described above, an amount of the bonding liquid sprayed from the sprayer 22b may be adjusted to become smaller than that sprayed from each of the sprayers 22a and 22c and may be set to an appropriate value in comparison with an amount of the bonding liquid adhering to each of the 1-ply paper sheets 110 and 101.

When the bonding liquid is highly permeable to the 1-ply paper sheets 110, 111, 100, and 101, the amount of the bonding liquid sprayed from the sprayer 22b may be maximized in an example, thus causing a larger amount of the bonding liquid to adhere to each of the 1-ply paper sheets 111 and 100 constituting intermediate layers of the 4-ply toilet paper 200. Moreover, the amount of the bonding liquid sprayed from each of the sprayers 22a and 22c may be adjusted to be smaller than that sprayed from the sprayer 22b, thus causing a smaller amount of the bonding liquid to adhere to each of the 1-ply paper sheets 110 and 101 constituting outer layers of the 4-ply toilet paper 200 and further causing the bonding liquid to permeate into the outer layers from the intermediate layers upon application of pressure (described later) by the pressure rollers 23. In such a case, suppression of damage on the 1-ply paper sheets 110 and 101 becoming the outer layers of the 4-ply toilet paper 200 (the 4-ply toilet paper roll 300) is expected.

If the bonding liquid has fairly high permeability, the 4-ply toilet paper 200 can also be formed by spraying a proper amount of the bonding liquid only from the sprayer 22b and by causing the bonding liquid to permeate into all the 1-ply paper sheets 110, 111, 100, and 101 when the pressure is applied by the pressure rollers 23.

The 1-ply paper sheets 110, 111, 100, and 101 with the bonding liquid adhering thereto are transferred to be sandwiched between the pressure rollers 23 while the rear surface of the 1-ply paper sheet 110 and the front surface of the 1-ply paper sheet 111 are brought into contact with each other, the rear surface of the 1-ply paper sheet 111 and the front surface of the 1-ply paper sheet 100 are brought into contact with each other, and the rear surface of the 1-ply paper sheet 100 and the front surface of the 1-ply paper sheet 101 are brought into contact with each other.

The pressure rollers 23 apply the pressure enough for permeating the bonding liquid into fiber-to-fiber gaps, for causing fibers of the 1-ply paper sheet 110 on a rear surface side and fibers of the 1-ply paper sheet 111 on a front surface side to be intertwined, for causing fibers of the 1-ply paper sheet 111 on a rear surface side and fibers of the 1-ply paper sheet 100 on a front surface side to be intertwined, and for causing fibers of the 1-ply paper sheet 100 on a rear surface side and fibers of the 1-ply paper sheet 101 on a front surface side to be intertwined.

With the pressure rollers 23 applying the pressure as described above, adjacent two of the 1-ply paper sheets 110, 111, 100, and 101 are bonded to each other, whereby the 4-ply toilet paper 200 is formed.

The 4-ply toilet paper 200 formed by the pressure rollers 23 is, as described above, dried by the drying unit 30 and rolled up by the rolling-up unit 40. As a result, the 4-ply toilet paper roll 300 is manufactured.

According to the embodiment, as described above, since the 4-ply toilet paper roll 300 (the 4-ply toilet paper 200) is formed by applying the bonding liquid to adhere between each adjacent two of the 1-ply paper sheets 110, 111, 100, and 101 and by causing the bonding liquid to permeate into the 1-ply paper sheets 110, 111, 100, and 101 by the pressure rollers 23, the bonding liquid can be permeated not only in a thickness direction of the 4-ply toilet paper 200 (a lamination direction of the 1-ply paper sheets 110, 111, 100, and 101), but also in a direction along a front surface (rear surface) of the 4-ply toilet paper 200, and the 1-ply paper sheets 110, 111, 100, and 101 can be suppressed from peeling off each other when the paper pulled out of the 4-ply toilet paper roll 300 is torn off in a desired length.

It is also possible to adjust the amount of the bonding liquid applied to adhere between adjacent two of the 1-ply paper sheets 110, 111, 100, and 101 and to desirably set the bonding strength between the adjacent two of the 1-ply paper sheets 110, 111, 100, and 101.

REFERENCE SIGNS LIST 1 toilet paper roll manufacturing apparatus
2 guide roller
10 base paper roll
10a base paper
11 base paper roll
11a base paper
20 lamination unit
21 guide roller
22a, 22b, 22c sprayer
23 pressure roller
30 drying unit
40 rolling-up unit
41 cutter
42 rolling-up pressure roller
43 rolling-up roller
100 1-ply paper sheet
101 1-ply paper sheet
110 1-ply paper sheet
111 1-ply paper sheet
200 4-ply toilet paper
300 4-ply toilet paper roll

The invention claimed is:

1. A toilet paper roll manufacturing method comprising:
a first step of pulling out base paper from each of multiple base paper rolls;
a second step of introducing multiple sheets of the base paper to a lamination unit, laminating the multiple sheets of the base paper, and forming 4-ply toilet paper;
a third step of drying the 4-ply toilet paper; and
a fourth step of rolling up the 4-ply toilet paper and manufacturing a 4-ply toilet paper roll,
wherein the second step comprises:
a fifth step of separating the multiple sheets of the base paper introduced to the lamination unit into a first 1-ply paper sheet, a second 1-ply paper sheet, a third 1-ply paper sheet, and a fourth 1-ply paper sheet, positioning a rear surface of the first 1-ply paper sheet and a front surface of the second 1-ply paper sheet to face each other, positioning a rear surface of the second 1-ply paper sheet and a front surface of the third 1-ply paper sheet to face each other, and positioning a rear surface of the third 1-ply paper sheet and a front surface of the fourth 1-ply paper sheet to face each other;

a sixth step of operating a first sprayer to spray a bonding liquid toward the rear surface of the first 1-ply paper sheet and the front surface of the second 1-ply paper sheet;

a seventh step of operating a second sprayer to spray the bonding liquid toward the rear surface of the second 1-ply paper sheet and the front surface of the third 1-ply paper sheet;

an eighth step of operating a third sprayer to spray the bonding liquid toward the rear surface of the third 1-ply paper sheet and the front surface of the fourth 1-ply paper sheet; and a ninth step of operating a pressure roller to stack the first 1-ply paper sheet, the second 1-ply paper sheet, the third 1-ply paper sheet, and the fourth 1-ply paper sheet and to apply pressure to permeate the bonding liquid into the first to fourth 1-ply paper sheets.

2. The toilet paper roll manufacturing method according to claim 1,
wherein, in the second step,
the sixth step, the seventh step, and the eighth step are performed simultaneously.

3. The toilet paper roll manufacturing method according to claim 2,
wherein, in the seventh step,
an amount of the bonding liquid sprayed from the second sprayer is smaller than an amount of the bonding liquid sprayed from the first sprayer and an amount of the bonding liquid sprayed from the third sprayer.

4. The toilet paper roll manufacturing method according to claim 2,
wherein, in the seventh step,
an amount of the bonding liquid sprayed from the second sprayer is larger than an amount of the bonding liquid sprayed from the first sprayer and an amount of the bonding liquid sprayed from the third sprayer.

5. The toilet paper roll manufacturing method according to claim 1,
wherein, in the second step,
the sixth step, the seventh step, and the eighth step are repeated intermittently such that;
spray of the bonding liquid by the first sprayer and the third sprayer and spray of the bonding liquid by the second sprayer are performed alternately.

6. The toilet paper roll manufacturing method according to claim 3,
wherein, in the seventh step,
an amount of the bonding liquid sprayed from the second sprayer is smaller than an amount of the bonding liquid sprayed from the first sprayer and an amount of the bonding liquid sprayed from the third sprayer.

7. The toilet paper roll manufacturing method according to claim 5,
wherein, in the seventh step,
an amount of the bonding liquid sprayed from the second sprayer is larger than an amount of the bonding liquid sprayed from the first sprayer and an amount of the bonding liquid sprayed from the third sprayer.

8. The toilet paper roll manufacturing method according to claim 1,
wherein, in the second step,
the sixth step, the seventh step, and the eighth step are repeated intermittently such that;
the first sprayer, the second sprayer, and the third sprayer intermittently spray the bonding liquid in different time lengths.

9. The toilet paper roll manufacturing method according to claim 8,
wherein, in the seventh step,
an amount of the bonding liquid sprayed from the second sprayer is smaller than an amount of the bonding liquid sprayed from the first sprayer and an amount of the bonding liquid sprayed from the third sprayer.

10. The toilet paper roll manufacturing method according to claim 8,
wherein, in the seventh step,
an amount of the bonding liquid sprayed from the second sprayer is larger than an amount of the bonding liquid sprayed from the first sprayer and an amount of the bonding liquid sprayed from the third sprayer.

11. The toilet paper roll manufacturing method according to claim 1,
wherein, in the seventh step,
an amount of the bonding liquid sprayed from the second sprayer is smaller than an amount of the bonding liquid sprayed from the first sprayer and an amount of the bonding liquid sprayed from the third sprayer.

12. The toilet paper roll manufacturing method according to claim 1,
wherein, in the seventh step,
an amount of the bonding liquid sprayed from the second sprayer is larger than an amount of the bonding liquid sprayed from the first sprayer and an amount of the bonding liquid sprayed from the third sprayer.

* * * * *